(12) United States Patent
Beard et al.

(10) Patent No.: US 9,428,231 B2
(45) Date of Patent: Aug. 30, 2016

(54) CLIMBING VEHICLE WITH SUSPENSION MECHANISM

(71) Applicants: James Walter Beard, Cookeville, TN (US); Stephen Lee Canfield, Cookeville, TN (US); David Andrew Bryant, Lebanon, TN (US)

(72) Inventors: James Walter Beard, Cookeville, TN (US); Stephen Lee Canfield, Cookeville, TN (US); David Andrew Bryant, Lebanon, TN (US)

( * ) Notice: Subject to any disclaimer, the term of this patent is extended or adjusted under 35 U.S.C. 154(b) by 34 days.

(21) Appl. No.: 14/179,464

(22) Filed: Feb. 12, 2014

(65) Prior Publication Data

US 2014/0339004 A1    Nov. 20, 2014

Related U.S. Application Data

(60) Provisional application No. 61/764,448, filed on Feb. 13, 2013.

(51) Int. Cl.
| | |
|---|---|
| *B62D 55/00* | (2006.01) |
| *B62D 55/02* | (2006.01) |
| *B62D 55/075* | (2006.01) |
| *B62D 55/104* | (2006.01) |
| *B62D 55/265* | (2006.01) |

(52) U.S. Cl.
CPC ............. *B62D 55/02* (2013.01); *B62D 55/075* (2013.01); *B62D 55/104* (2013.01); *B62D 55/265* (2013.01)

(58) Field of Classification Search
CPC .................................................. B62D 55/265
USPC ........................ 180/164, 6.7, 9, 9.1; 114/222
See application file for complete search history.

(56) References Cited

U.S. PATENT DOCUMENTS

| | | | | |
|---|---|---|---|---|
| 2,132,661 | A * | 10/1938 | Temple ........................ | 180/6.66 |
| 3,810,515 | A * | 5/1974 | Ingro .......................... | 180/54.2 |
| 4,828,059 | A * | 5/1989 | Naito et al. .................. | 180/119 |
| 5,366,038 | A * | 11/1994 | Hidetsugu et al. ........... | 180/164 |
| 5,894,901 | A * | 4/1999 | Awamura et al. ........... | 180/9.54 |
| 6,125,955 | A * | 10/2000 | Zoretich et al. ............. | 180/7.1 |
| 7,866,421 | B2 * | 1/2011 | Moore et al. ................ | 180/9.21 |
| 8,342,281 | B2 * | 1/2013 | Rooney et al. .............. | 180/164 |
| 2008/0308324 | A1 * | 12/2008 | Moser et al. ................. | 180/6.7 |
| 2010/0212981 | A1 * | 8/2010 | Roos et al. .............. | 180/65.275 |
| 2014/0077587 | A1 * | 3/2014 | Smith et al. .................... | 305/15 |

\* cited by examiner

*Primary Examiner* — Tony Winner

(57) ABSTRACT

A climbing vehicle capable of high payload to weight ratio and capable of climbing surfaces with geometric variations is enabled through a suspension mechanism consisting of a resilient runner chain. The resilient runners contain adhering members such as magnets that create forces directed toward a ferrous climbing surface. The resilient runner has flexibility and internal stiffness or additional springs that transfer these forces to the climbing vehicle chassis and payload to provide equilibrium during the climbing process. It is able to conform to a large range of surface irregularities while providing push and pulling forces between the adhering members and the climbing vehicle chassis to uniformly distribute the climbing loads on the adhering members. The result is a climbing machine that can accommodate large surface irregularities while maximizing the climbing payload with a minimum number and size of adhering members.

19 Claims, 19 Drawing Sheets

Basic form of the invention

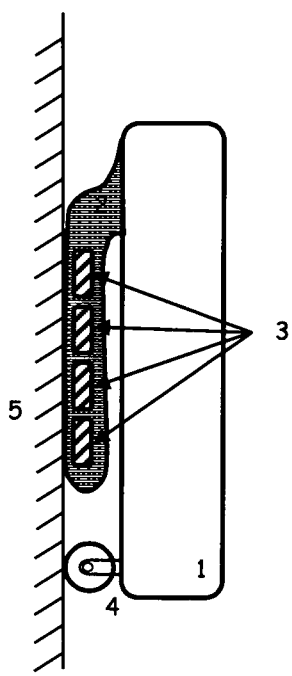
Fig. 1: Basic form of the invention

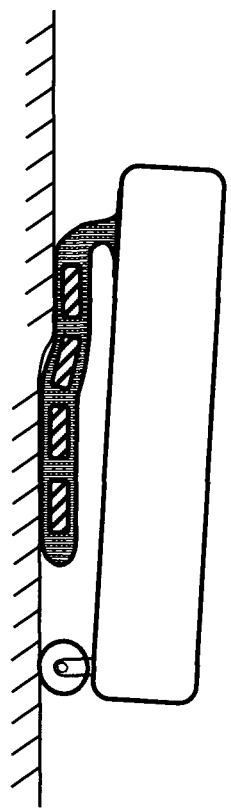
Fig. 2: Climbing vehicle on irregular surface

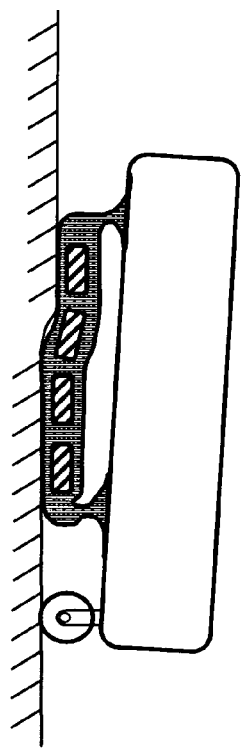
Fig. 3: Climbing vehicle with resilient runner connected to chassis in multiple locations

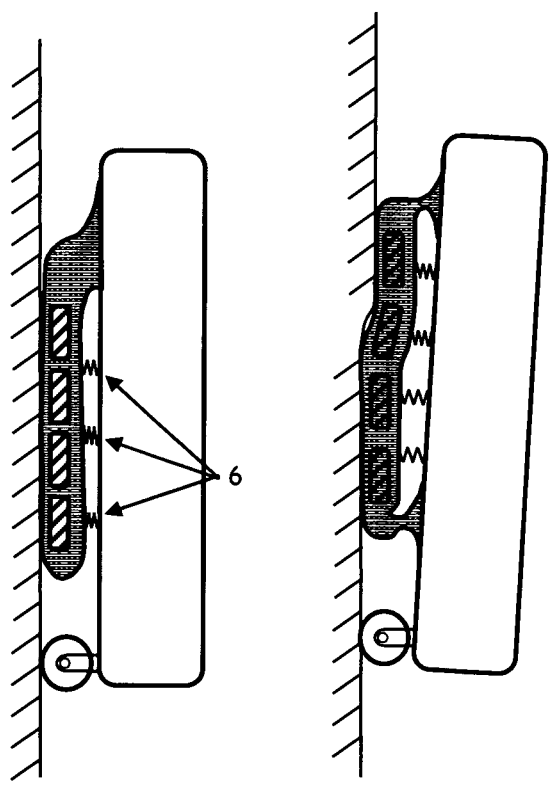
Fig. 4: Climbing vehicle with additional springs

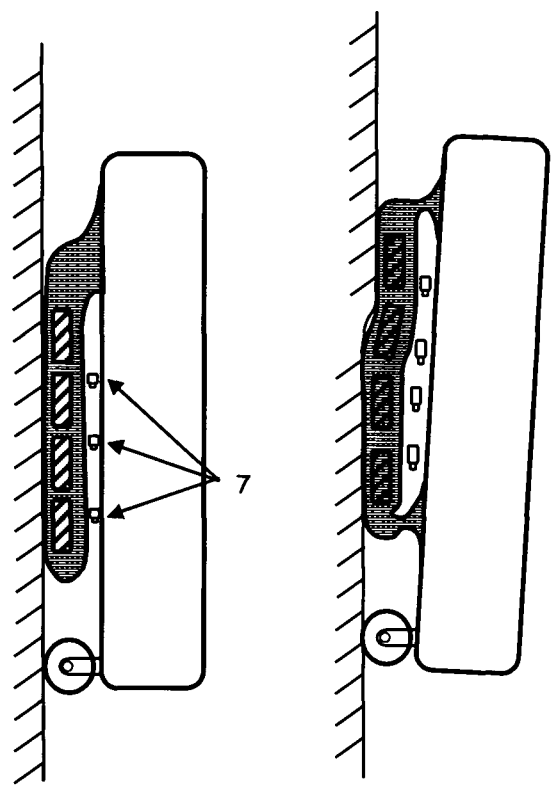
Fig. 5: Climbing vehicle with actuators connecting resilient runner to chassis

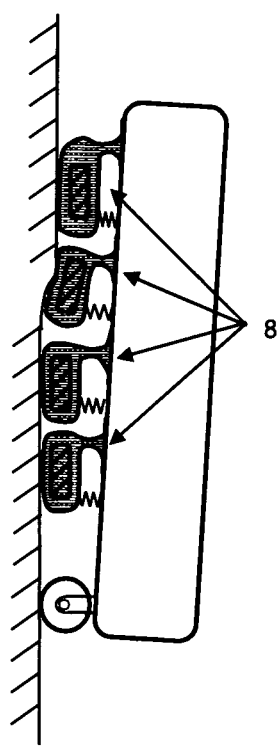
Fig. 6: Climbing vehicle with multiple resilient runners

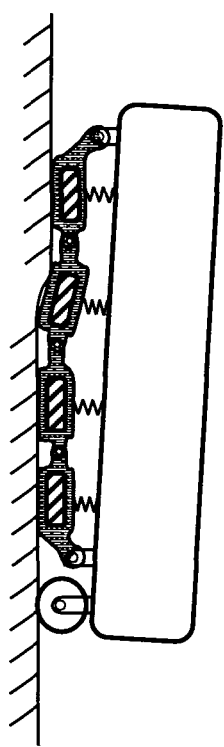
Fig. 7: Climbing vehicle with resilient runners pivotally attached in a chain

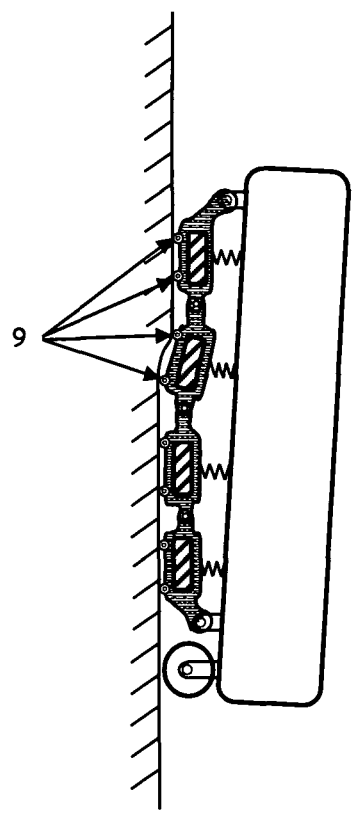
Fig. 8: Climbing Vehicle with rollers pivotally attached to resilient runner

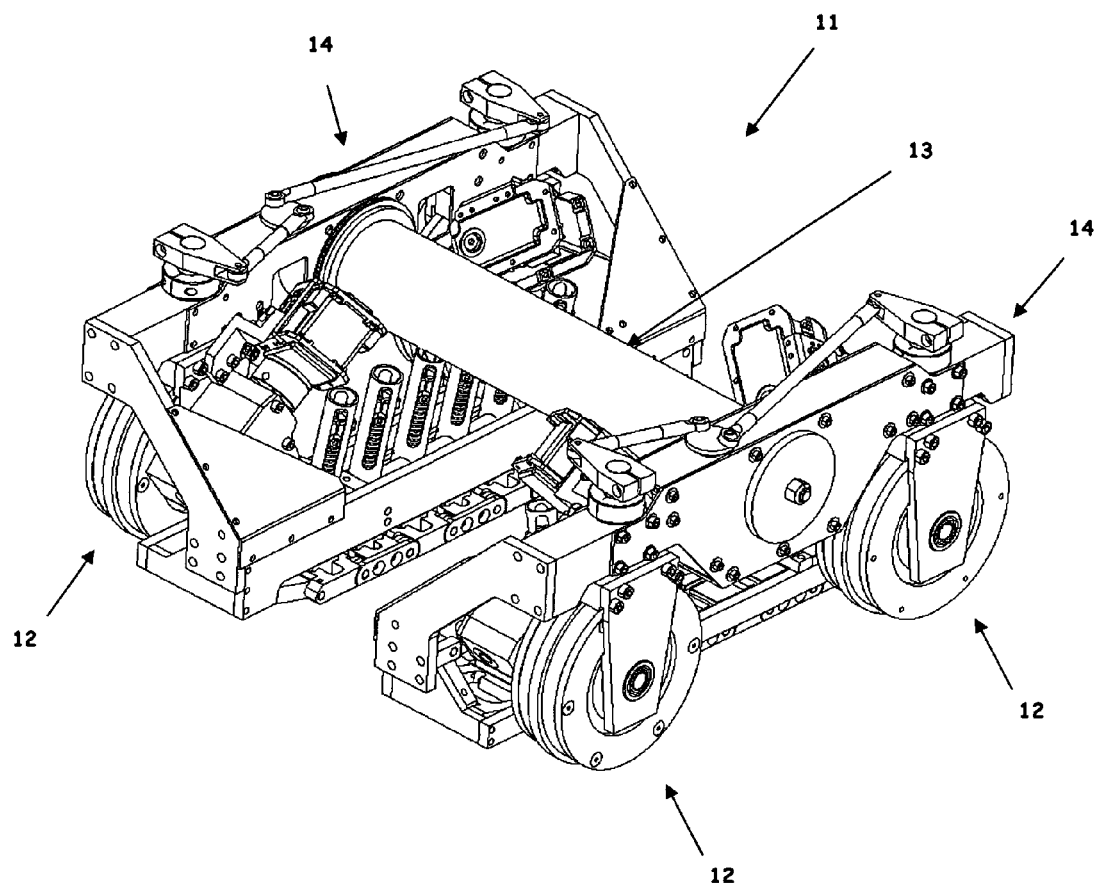
Figure 9: Isometric view of preferred embodiment of the climbing vehicle

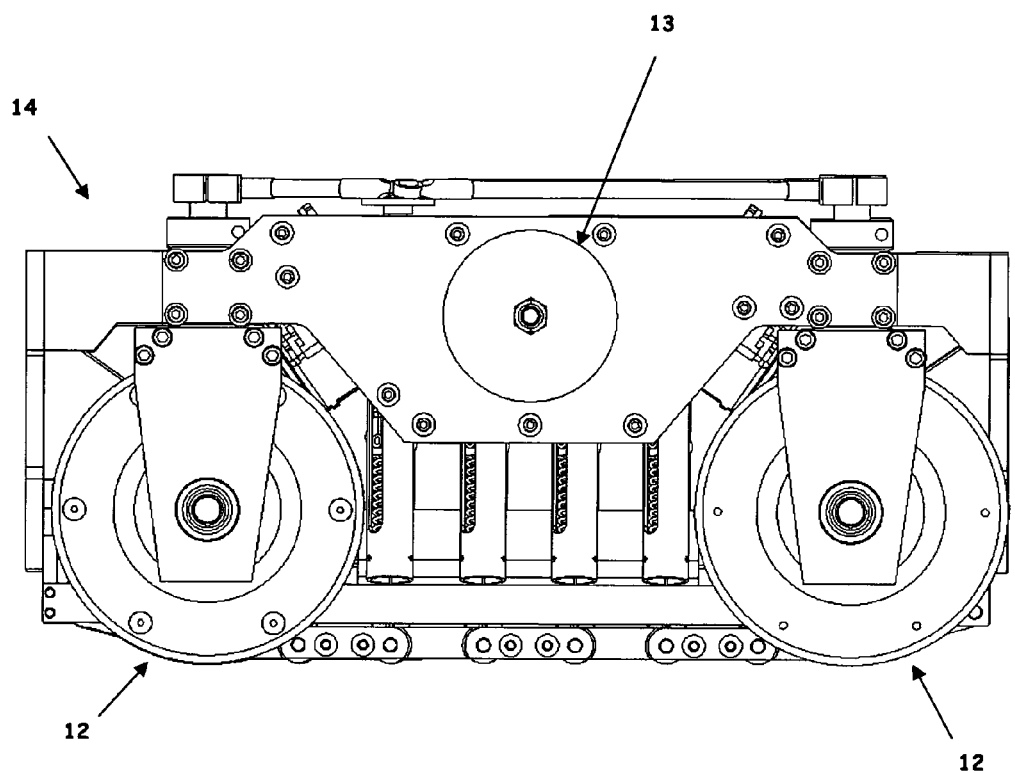
Figure 10: side view of preferred embodiment

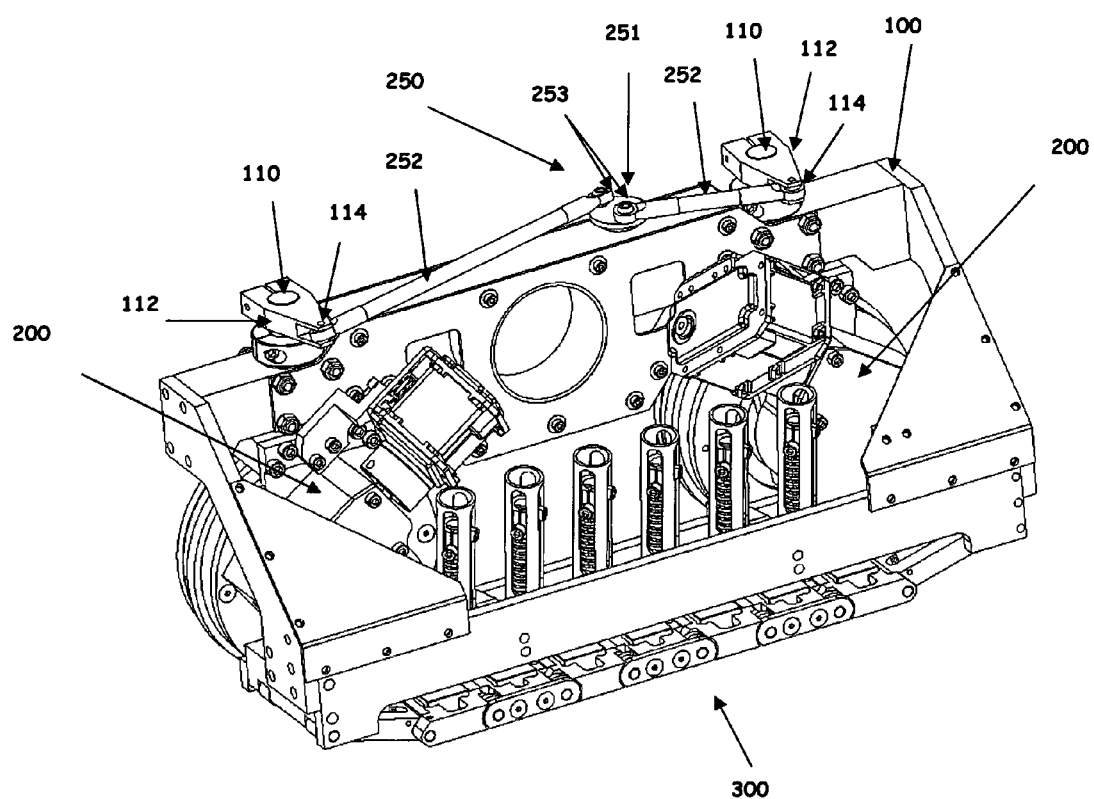
Fig. 11: Isometric view of chassis unit

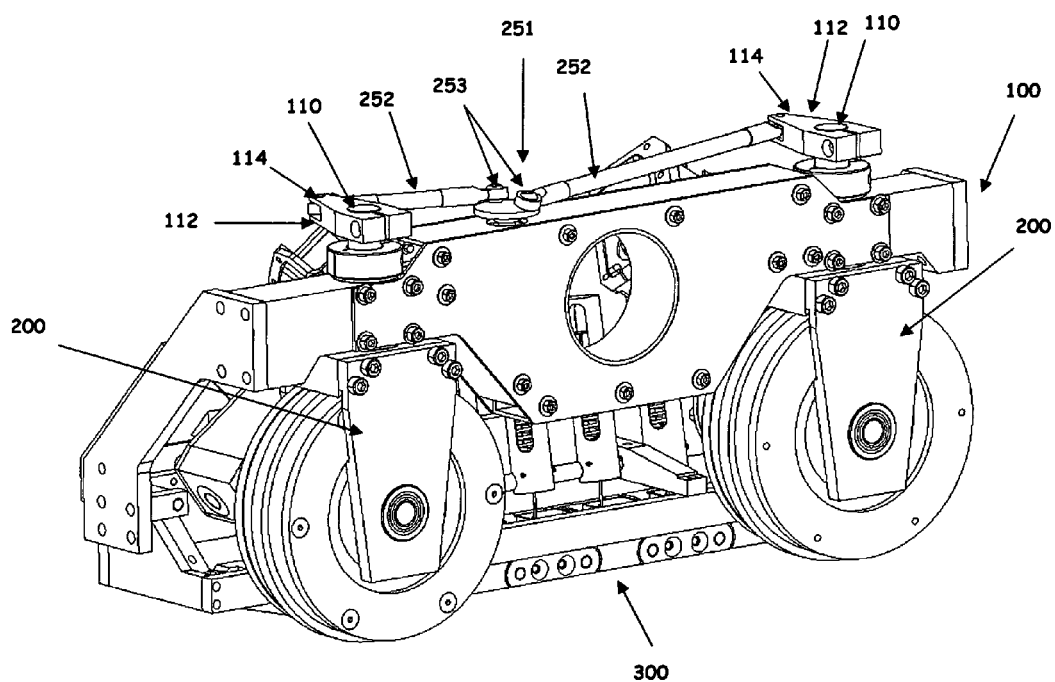
Fig. 12: Isometric view of chassis unit, wheel side

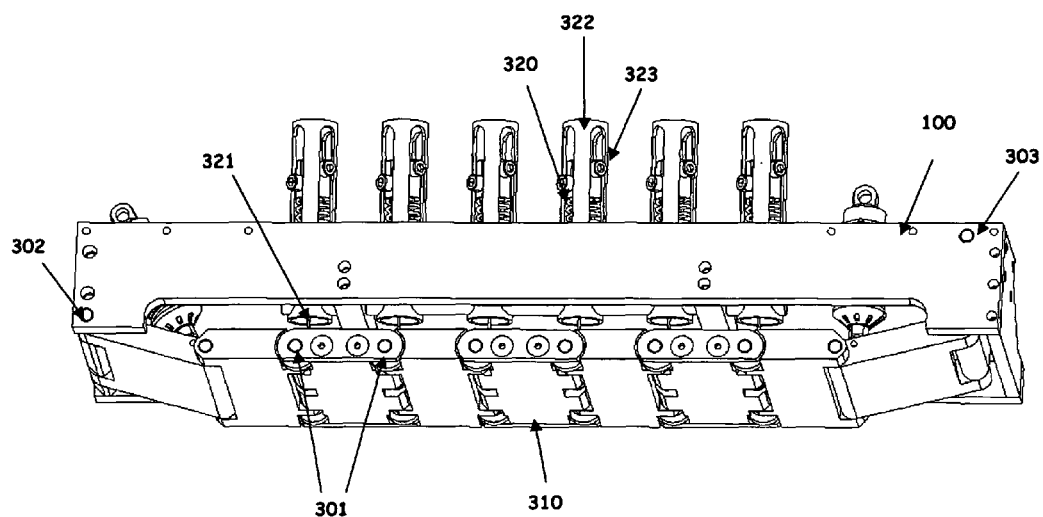
Figure 13: Isometric view of suspension mechanism isolated from the chassis unit

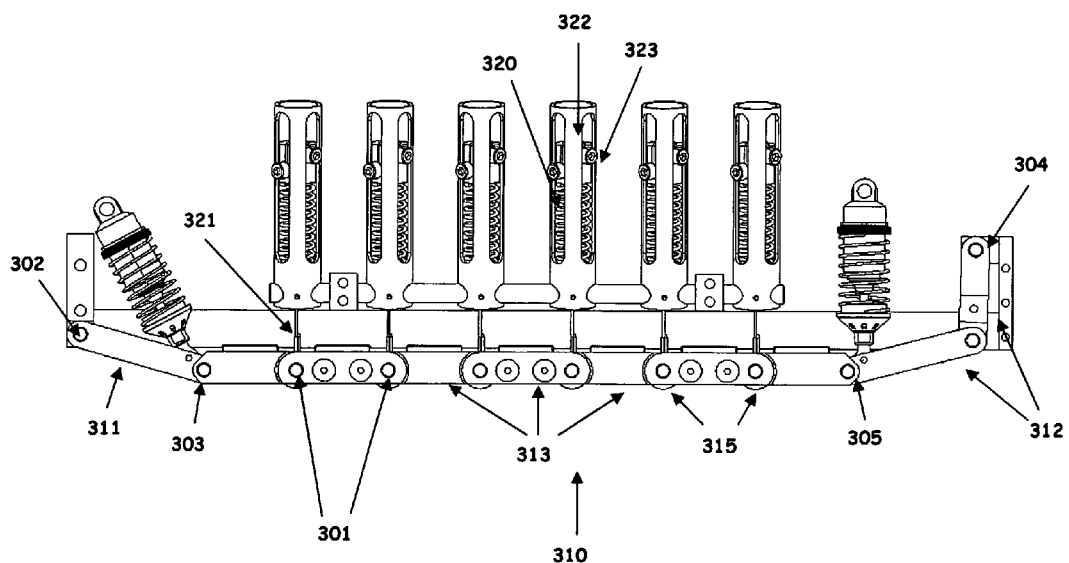
Figure 14: Side view of suspension mechanism isolated from the chassis unit

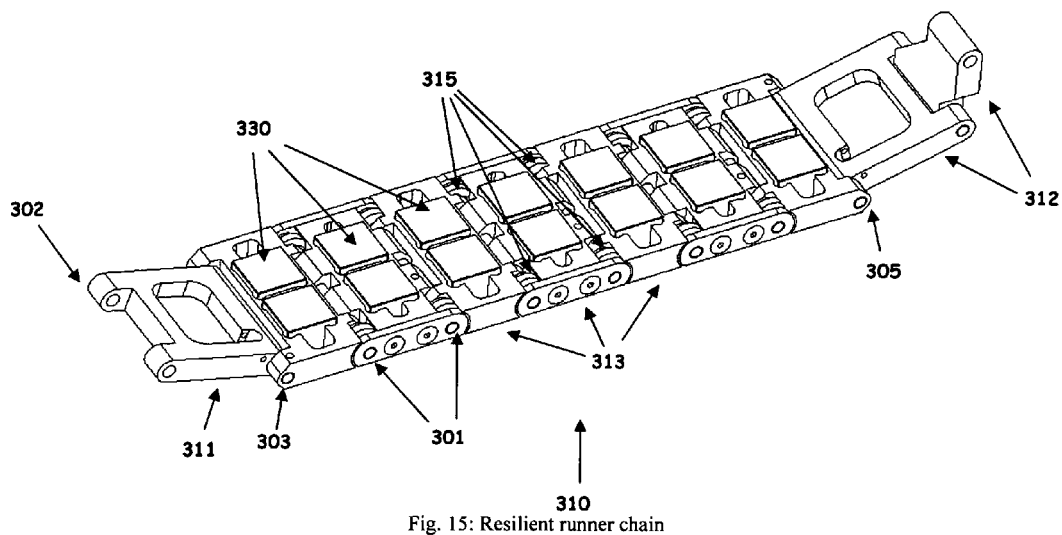
Fig. 15: Resilient runner chain

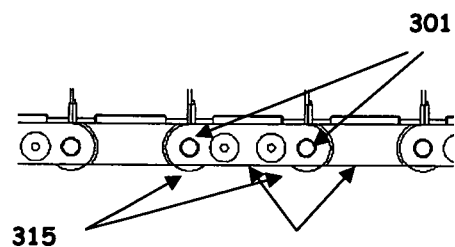
Fig. 16 Side view of two interior links.
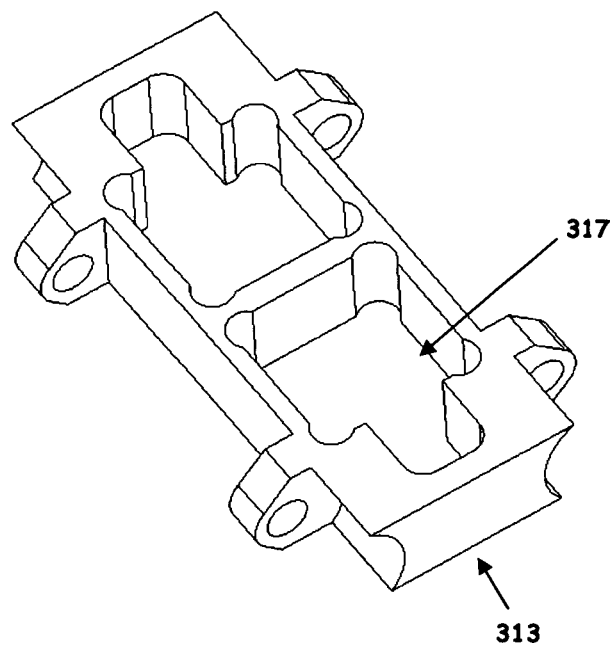
Fig. 17: Single interior resilient runner link

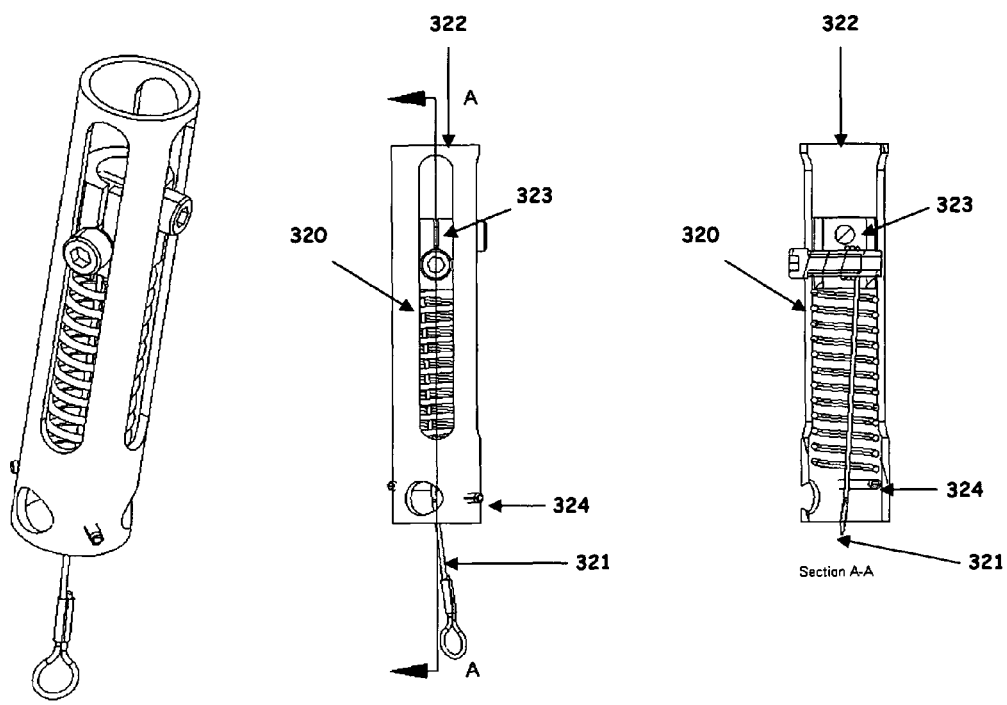
Figure 18: Three views of the spring element

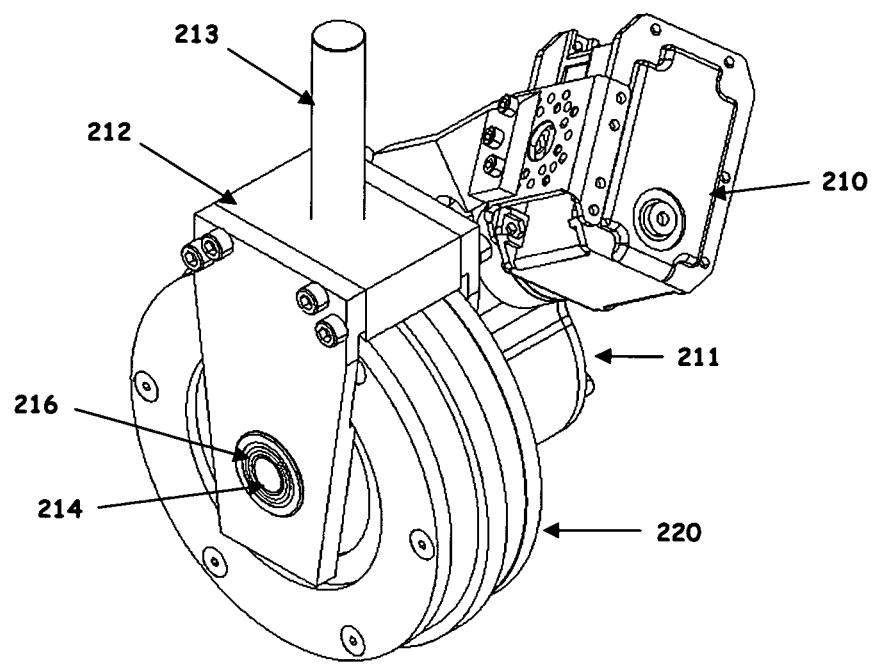
Figure 19: Details of the Wheel Module

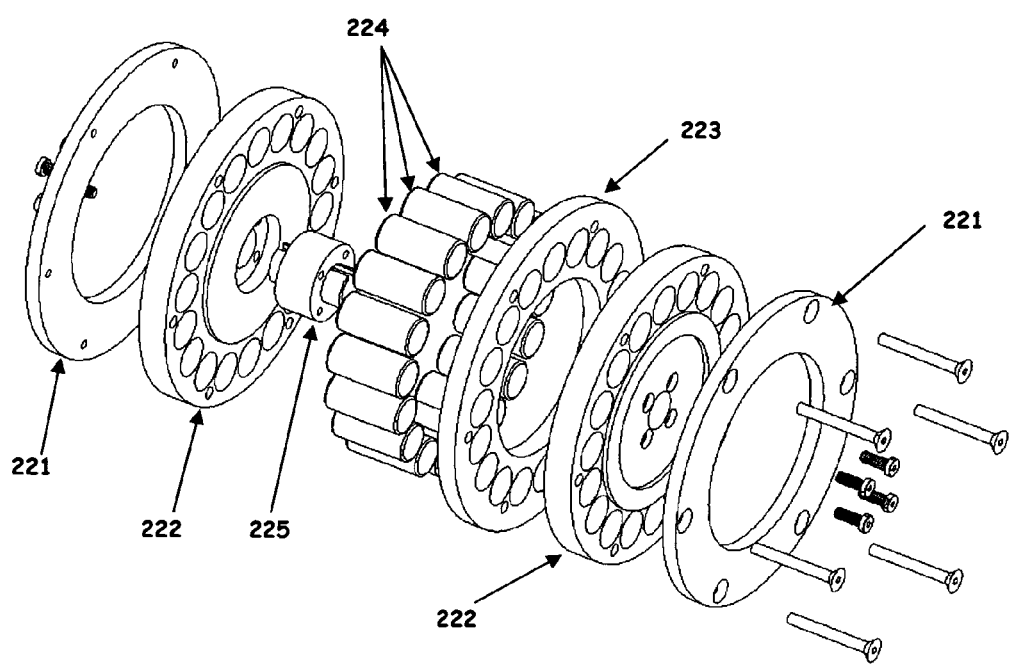
Figure 20: Details of the rolling wheel.

CLIMBING VEHICLE WITH SUSPENSION MECHANISM

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention applies to a category of self-propelled, climbing vehicles that primarily make use of wheels or endless tracks to provide propulsion along a climbing surface, but could employ legs. For this purpose, the term climbing vehicle refers to a vehicle that is capable of traversing a surface horizontally or vertically in some inclined or inverted position relative to the earth horizon. Further, it is intended that the climbing vehicle is able to accommodate irregularity in the climbing surface including convex or concave regions. Such climbing vehicles may be used to conduct remote operations such as inspection, maintenance, or manufacturing in environments that pose difficulty or danger for human operation. These climbing vehicles could also be used in a wide variety of applications including power production, civil structures, or shipbuilding. A variety of climbing vehicles have been proposed to operate in these conditions. The methods of achieving mobility for climbing vehicles include but are not limited to legged locomotion, endless tracks or wheeled devices. Patent literature demonstrating examples of climbing vehicles employing endless tracks include U.S. Pat. No. 3,960,229, U.S. Pat. No. 4,789,037, U.S. Pat. No. 4,828,059, U.S. Pat. No. 5,366,038, U.S. Pat. No. 5,435,405, U.S. Pat. No. 5,487,440, U.S. Pat. No. 5,884,642, U.S. Pat. No. 5,894,901, U.S. Pat. No. 6,889,783, U.S. Pat. No. 7,498,542 B2, U.S. Pat. No. 7,775,312, and US application publication numbers US 2012/0111649 A1, US 2012/0116583 A1, US 2012/0111843 A1. Patent literature demonstrating examples of climbing vehicles employing wheels include U.S. Pat. No. 3,690,393, U.S. Pat. No. 3,810,515, U.S. Pat. No. 4,010,636, U.S. Pat. No. 5,049,218, U.S. Pat. No. 5,355,807, U.S. Pat. No. 5,853,655, U.S. Pat. No. 6,000,484, U.S. Pat. No. 6,564,815, US 6,59622, U.S. Pat. No. 6,595,152, U.S. Pat. No. 6,627,004 B1 2003, U.S. Pat. No. 6,688,938, U.S. Pat. No. 6,793,026, U.S. Pat. No. 6,886,651, and US application publication numbers US 2009/0078484, U.S. Pat. No. 7,309,464 B2, US 2010/0212983 and US 2010/017610. The majority of the wheeled-type climbing vehicles employ magnets in the wheel portion as demonstrated in U.S. Pat. No. 2,694,164. Advanced features in magnetic wheels have been demonstrated, for example as in U.S. Pat. No. 6,125,955. The use of wheels in climbing platforms provides several advantages, including relative simplicity in their design and actuation, and constant pitch properties that contribute to uniform motion transfer. The primary difficulty in using a wheeled-type platform for climbing is that the wheels require theoretical point contact with the surface to enable efficient rolling. This point contact limits the region in which adhering elements can connect or be in close proximity to the climbing surface. Adhering elements may be made of magnets, suction cups, adhesive or other device that can create an adhering force to the climbing surface. The size of the contact region for adhering members is generally related to the amount of adhering force that can be generated.

The size of the available contact region for wheeled climbing vehicles can be increased by increasing the number of wheels in contact with the climbing surface to yield an increase in the overall adhering force of the vehicle. For example, when magnets are used as adhering members, they may be embedded in the wheel to rotate with the wheel (U.S. Pat. No. 2,694,164), or they may be suspended to the wheel axis but have the ability to move circumferentially about the wheel (US pat. App. 0212983). While the overall adhering force of the vehicle can be increased by increasing the number of wheels in contact with the climbing surface, this raises several technical difficulties in the design and implementation of these systems. First, as the number of wheels increases, the complexity of the system increases. Second, as the number of wheels in contact with the climbing surface increases beyond a minimal number, for example three to provide stability when the contact surface is non-planar, wheel suspensions are required to ensure wheel contact with the surface. Third, as the number of wheels in contact with the surface increases, the kinematic requirements for steering increase, or slipping is introduced into the system which decreases efficiency. For these reasons, climbing vehicles with large numbers of wheels that have the adhering members integrated in the wheels are seldom seen in practice.

More commonly, wheeled vehicles that employ adhering members integrated into the wheels employ a reduced or minimal number of wheels in wheel-based climbing systems. This can be seen in several examples in the literature including U.S. Pat. No. 6,627,004, U.S. Pat. No. 6,793,026 and U.S. Pat. No. 7,625,827. These typically employ either three wheels or four wheels. Three wheel systems enjoy the advantage of not requiring any type of suspension to insure contact of each wheel with the climbing surface when climbing on non-planar terrain. Four wheel systems are shown to incorporate a simple suspension design to maintain contact between the wheels and the climbing surface.

When a reduced number of wheels, for example three or four, are employed in a wheel-based climbing system, the forces required for equilibrium directed away from the surface will at times during operation be concentrated on a single wheel and associated adhering member. This concentration of forces on a single wheel results in a reduced payload capacity of the climbing vehicle. The payload capacity of climbing vehicles is one of the primary performance metrics in the design of such a vehicle. Thus, wheel-type climbing robot vehicles that place the adhering members in our about the wheels have limitations in the payload capacity.

Alternatively, the literature of wheel-type climbing robots demonstrates inventions that place the adhering members in the frame or chassis of the vehicle. An example of this is given in U.S. Pat. No. 3,810,515. This type of design is employed in a large number of commercially available climbing platforms. An example of such a commercial product is the Handiweld sold by Bug-O.

The design that places the adhering member directly in the chassis encounters significant performance limitations however when the system is used on a surface that is not flat, or has protrusions or indentions in the surface. This limitation arises from a technical difficulty that the chassis cannot conform to variations in the geometry of the climbing surface, such that the distance between the chassis and surface is changing during operation. The adhering force is typically strongly dependent on this distance, with an increase in distance between the adhering member and the climbing surface generally resulting in a decrease in adhering force. The decreased adhering force limits the available payload, thus limiting the performance of this type of invention.

The invention of this patent provides a novel means to overcome the limitations discussed for wheel-type climbing platforms. This invention provides a means to increase the number or magnitude of adhering force elements without increasing the number of wheels in a wheel-type climbing platform. The invention also provides a means to ensure or maintain a constant distance between the adhering force member and the climbing surface, to maintain the magnitude of adhering force during operation. Finally, the invention provides a means to distribute the loads required for equilibrium during climbing in an optimal manner over a large number of adhering members, while making sure that all wheel members stay in contact with the climbing surface.

When considering the prior art for climbing machines, with a focus on machines designed to climb ferrous surfaces using magnets, it is generally accepted that the climbing payload capacity is a function of the following components: 1) gross magnetic adhering force available, 2) the distribution of the gross magnetic adhering force, through a discrete number and location of individual magnetic elements, and 3) how the forces required for equilibrium in climbing are distributed among all the magnetic elements. Each of these components is considered in turn.

1) Gross magnetic adhering force available: The total magnetic attraction is generally not addressed as a limiting factor in the range of patents presented in climbing vehicle literature. The patent literature does not readily identify a need to optimize this force, and generally assumes that the magnetic force can be scaled.
2) Distribution of the gross magnetic adhering force through a discrete number and location of individual elements: The gross magnetic adhering force is generally discretized and distributed over the vehicle in one of three ways;
   a. discretized into a finite number of wheels (e.g., U.S. Pat. No. 7,625,827),
   b. located in the chassis (e.g., U.S. Pat. No. 3,810,515),
   c. distributed over the exterior surface of an endless track (e.g., U.S. Pat. No. 5,435,405),
3) How the loads are distributed over the discretized magnet locations: For the wheel systems, with 4 wheels demonstrated, a maximum of three wheels can be employed on a general surface and therefore a redundancy of n−3 (with n=number of wheels) exists. The load thus can only be distributed to 3 wheels in the limiting case. This even occurs when mobility is added to the system to allow for movement of multiple wheels as seen in US pat. App. 2010/0176106. The rare example is U.S. Pat. No. 6,000,484 which calls out springs (kinetic constraints), but this patent does not identify a distribution means. For vehicles with the magnets located in the chassis, the adhering force is now a function of the distance between the chassis and the climbing surface. Thus, small displacements between the chassis and the climbing surface, caused by variations in the surface geometry, are greatly magnified and reduce the actual attraction force. For tracked systems with the adhering members or magnets located in the tracks, the difficulty becomes in simultaneously allowing the tracks to conform to the climbing surface while transferring forces between all elements along the track and the vehicle body. The majority of patents employing endless tracks with adhering members in the tracks do not provide a means to distribute climbing forces among the track elements.

There are a few special cases of note that do provide a means to distribute the climbing forces among more than 3 of the discrete magnets. U.S. Pat. No. 7,624,827 employs and endless track that surrounds a series of magnetic wheels, and provides a means to transfer both pulling and pushing forces from the wheels to the chassis. US application publication number US 2012/0111649 A1 shows a climbing vehicle with magnets attached to the endless track and provides a suspension that is slidably connected to the endless track to allow a means to transfer both pulling and pushing forces from all the adhering members to the chassis. A primary limitation of the U.S. Pat. No. 7,624,827 invention is that it does not permit a mechanism to return a distributed magnet back to the wall if the pulling force exceeds the magnet force. The primary limitation of US application publication number US 2012/0111649 A1 is that the tracks with exterior magnets create a non-constant pitch distance and therefor non-uniform velocity transmission between input and output.

A closer inspection of the prior art considering wheel-type climbing vehicles shows a broad number and range of inventions. In general, these systems can be placed into two categories, those that place the adhering members as part of the wheel or those that place the adhering members as part of the vehicle body or chassis. Examples of the first category, wheel-type climbing vehicles with adhering members located in the wheels include U.S. Pat. No. 3,690,393, U.S. Pat. No. 4,010,636, U.S. Pat. No. 5,049,218, U.S. Pat. No. 5,355,807, U.S. Pat. No. 5,853,655, U.S. Pat. No. 6,000,484, U.S. Pat. No. 6,564,815, US 6,59622, U.S. Pat. No. 6,595,152, U.S. Pat. No. 6,627,004 B1 2003, U.S. Pat. No. 6,688,938, U.S. Pat. No. 6,793,026, U.S. Pat. No. 6,886,651, US pat. App. 2009/0078484, U.S. Pat. No. 7,309,464 B2, US pat. App. 2010/0212983 and US pat. App. 2010/017610. One of the earliest examples of such an early example of this system is U.S. Pat. No. 3,690,393 to create a toy car on track. This invention shows a four-wheel system, although other numbers of wheels have been shown with combinations of traditional and non-traditional wheels (U.S. Pat. No. 6,793,026). While the number of wheels is not specified or unique in the claims, and therefore not limiting to a large number of magnetic wheels, these patents do not address the kinematic constraints that are imposed when additional wheels are added in order to maintain wheel roll without slip. Additionally, these patents do not address potential slip conditions.

Some of the wheel-type inventions include adhering members in the wheels with the rotational axis of all wheels rigidly attached to a rigid platform. Alternatively, some inventions that include adhering members in the wheels (for example, US pat. App. 0212983) have some or all of the wheels pivotally connected to a member that is pivotally connected to the chassis allowing the wheel pivot movement relative to the chassis.

This patent presents a new invention for a climbing vehicle system. This invention places the adhering members (members that create an adhering force to the climbing surface) on a suspension member, called a resilient runner, which is attached to the vehicle chassis in a way that allows the resilient runner to move independently of the vehicle chassis to accommodate variations in the geometry of the climbing surface. Furthermore, the resilient runner is able to transfer forces between the chassis and the adhering members in a manner that distributes the loads required for equilibrium among multiple adhering members. The resilient runner can deform to accommodate large variations in the geometry of the climbing surface. This allows the adhering members to maintain a constant distance from the climbing surface to maintain the adhering force. Finally, the invention provides a mechanism by which the resilient runner will be automatically or self-attract to the climbing surface.

BRIEF SUMMARY OF THE INVENTION

The invention disclosed in this patent provides a novel climbing vehicle capable of high payload to weight ratio and capable of climbing surfaces with geometric variations. It does this through suspending the adhering members on a suspension member called a resilient runner that distributes the climbing forces in an optimal manner over the adhering elements, and transfers these forces to the climbing platform. The invention allows the resilient runner to adapt to irregularities in the geometry of the climbing surface, and maintain a constant distance between the adhering members and the climbing surface. Further, this invention provides a means to self-reattach the adhering members to the climbing surface. The invention achieves these capabilities through the following manner:

1) The invention offers a suspension for the adhering members that is able to match a large range of surface geometric irregularities. It does this by creating the primary suspension as a resilient runner that can flex to accommodate variations in the climbing surface geometry. The invention can also contain multiple resilient runners in a serial chain pivotally connected that can independently flex without strain. The invention allows the adhering members to be contained in the resilient runners.
2) The invention prescribes the surface-normal load distribution on all the adhering members through the resilient members and or additional resilient members or actuators that connect the resilient runners to the chassis. When the resilient member deforms, it transfers a force to the chassis.

BRIEF DESCRIPTION OF DRAWINGS

FIG. 1 shows the basic form of the invention for the climbing vehicle.

FIG. 2 shows the climbing vehicle on an irregular surface.

FIG. 3 shows the climbing vehicle with the resilient runner connected to the chassis at multiple locations.

FIG. 4 shows the climbing vehicle with additional springs.

FIG. 5 shows the climbing vehicle with actuators connecting the resilient runner to the chassis.

FIG. 6 shows the climbing vehicle with multiple resilient runners.

FIG. 7 shows the climbing vehicle resilient runners pivotally attached in a chain.

FIG. 8 shows the climbing vehicle with rollers pivotally attached to the resilient runner.

FIG. 9 shows an isometric view of the preferred embodiment of the climbing vehicle FIG. 10 shows a side view of the preferred embodiment of the climbing vehicle.

FIG. 11 shows an isometric view of the chassis unit.

FIG. 12 shows an isometric view of the chassis unit, wheel side.

FIG. 13 shows an isometric view of the suspension mechanism isolated from the chassis unit.

FIG. 14 shows a side view of the suspension mechanism isolated from the chassis unit.

FIG. 15 shows the resilient runner chain.

FIG. 16 shows a side view of the interior links.

FIG. 17 shows a single interior resilient runner link.

FIG. 18 shows three views of the spring element.

FIG. 19 shows the details of the wheel module.

FIG. 20 shows the details of the rolling wheel.

Throughout the figures identical reference numerals denote identical components.

DETAILED DESCRIPTION OF THE INVENTION

The invention disclosed here describes a climbing vehicle, robot or platform that is able to climb ferrous surfaces while accommodating variations in the geometry of the climbing surface and effectively transferring forces between the adhering members and the vehicle chassis. In a basic form, the invention consists of a chassis (1), resilient runner (2), adhering members (3) and a propulsion element (4) as shown in FIG. 1. The climbing vehicle is operating on a climbing surface (5) that may contain variations in geometry. The chassis forms the body of the vehicle and can be used to mount payloads, tools or other components. The resilient runner is attached to the chassis and makes sliding contact with the climbing surface. The resilient runner can deform to generally adapt or conform to the climbing surface (FIG. 2). The adhering members are attached to the resilient runner, for example through a bolted connection, a glued connection, fit into a molded shape in the resilient runner or some other means. The adhering members create an adhering force, for example a magnetic force, which attracts the adhering members to the surface. This force can cause the resilient runner to adapt or conform to the climbing surface. At the same time, as resilient member deforms, it transfers forces to the chassis. The adhering members attached to the resilient runner allow forces directed into the climbing surface to be transferred to the chassis. These forces act on the chassis to maintain the chassis in a state of equilibrium on the climbing surface while resisting the forces due to gravity, inertial effects, forces from the tooling operations or other. The resilient runner can be attached to the chassis at one or more locations (FIG. 3). The resilient runner carries the adhering members at a generally constant distance from the climbing surface. The propulsion element causes the chassis to traverse along the surface.

The transfer of forces between the resilient runner and the chassis can be further enhanced by connecting one or more springs (6) between the resilient runner and the chassis (FIG. 4). The springs are resilient members in and of themselves, but may be a useful means of introducing additional design parameters in the system to allow various design solutions to optimize the transfer of forces between the climbing surface and the chassis.

In operation, the climbing vehicle is subject to a variety of forces including gravitational and dynamic loads associated with the vehicle and payload motion, as well as forces generated by the operation of the tooling or equipment attached to the vehicle. To remain in equilibrium (static and dynamic) with the climbing surface, these forces are to be transferred to the climbing surface through the resilient runner to the adhering elements and the propulsion element.

The mechanism of this invention prescribes how these forces are transmitted from the vehicle body to the adhering members over a wide range of surface irregularity or contours. The forces are prescribed through the resilience of the resilient runner. The forces can also be prescribed through additional resilient members that connect the resilient runner to the chassis, or actuators that connect the resilient runner to the chassis.

The transfer of forces between the resilient runner and the chassis can be further enhanced by connecting one or more actuators (7) between the resilient runner and the chassis (FIG. 5). The actuators can be independently controlled to apply forces between the resilient runner and the chassis. One example is to require the actuator to maintain a constant force independent of its displacement, another example is to control the force in the actuator based on a measured value provided by sensors that measure the motion of the chassis relative to the climbing surface.

The climbing vehicle can have multiple resilient runners (8) attached to the chassis (FIG. 6). These can be longitudinally or laterally spaced along the chassis.

The climbing vehicle can have multiple resilient runners that are pivotally attached in a chain (FIG. 7). This can aid in allowing the resilient runners to accommodate a greater range of geometric variation of the climbing surface.

Rollers (9) can be pivotally connected to the resilient runners as shown in FIG. 8. The purpose of this modification is to reduce the sliding friction that may occur between the resilient runners and climbing surface by introducing the rollers. The rollers can be positioned such that the clearance between the resilient runners and surface is very small, to maintain the adhering force between the adhering members and climbing surface. The rollers may also provide the benefit of reducing wear on the resilient members that may result from sliding on the climbing surface.

Further Discussion of the Resilient Runner

The resilient runner is made of a material that can deform under the effect of some force. This material can be very stiff, i.e., providing very little deflection under significant force, or it can be very compliant, providing large deflection under a given force. The degree of resilience of the resilient runner is dictated by its material properties and geometry. If the resilience is large, then the resilient runner behaves substantially as a rigid member. In such a case, it is desirable to pivotally attach the resilient runner to the chassis (as in FIG. 7). Furthermore, when the when the resilient runner is very stiff, it may be desirable to have additional resilient members connect the resilient runner to the chassis to transfer forces between the adhering members and the chassis (as in FIG. 7). If the resilience is very small, then the resilient runner behaves substantially as a very compliant member. In such a case, it is desirable to have additional resilient members connect the resilient runner to the chassis to transfer forces between the adhering members and the chassis.

DETAILED DESCRIPTION OF THE PREFERRED EMBODIMENTS

A detailed description of one preferred embodiment is provided here. It is to be understood however that the present invention may be embodied in various forms. Therefore, specific details disclosed here are not to be interpreted as limiting, but rather as a basis for the claims and as a representative basis for teaching one skilled in the art to employ the present invention in virtually any appropriately detailed system, structure or manner.

FIGS. 9 and 10 show a climbing vehicle (11) consisting of two chassis units (14) and chassis connecting member (13). In this embodiment, each chassis unit consists of a chassis with two drive wheels (12). The chassis units are attached to the chassis connecting member through a pivot (16). This allows relative rotation between the two chassis units to allow all drive wheels to make contact with planar and non-planar climbing surfaces. The chassis units are geometrically similar in this embodiment. A chassis unit is shown in FIGS. 11 and 12. The chassis unit consists of chassis (100), two drive wheels modules (200), a steering gearmotor (250) and a suspension mechanism (300). Each drive wheel module is attached to the chassis through a pivot joint (110). A drive wheel connecting rod (112) connects at one end to one drive wheel module and at the other end to the steering link through a pivot joint (114). The steering gearmotor is rigidly attached to the chassis. A steering link (251) is rigidly attached to the output shaft of the steering gearmotor. A steering connecting rod (252) connects at one end to the steering link through a ball joint (253) and at the other end to a drive wheel connecting rod. The chassis, drive wheel modules and drive wheel connecting rod form a four bar linkage with one degree of freedom. The linkage can be configured such that both drive wheel modules rotate in the same direction, or rotate in opposite directions depending on the type of steering desired. Alternatively, the drive wheel connecting rod could be eliminated and each drive wheel module has its own steering gearmotor to allow independent rotation control of each drive wheel module.

FIGS. 13 and 14 shows the suspension mechanism isolated from the chassis unit. The suspension mechanism consists of a resilient runner chain (310), springs (320) and adhering members (330). The resilient runner chains are connected to each other through pivot joints (301). One end of the suspension link chain is connected to the frame through a pivot joint (302). The other end of the resilient runner chain is connected to the frame through a pivot joint (303). In the embodiment shown, a cable (321) connects each spring to the resilient runner chain at the pivot joints (301). The cable connects to the spring at a terminal block (322), and the springs reside in tubes (323) that are rigidly connected to the frame (100).

The central links in the resilient runner chain are the interior resilient runners (313). The interior resilient runners contain embedded adhering members and are connected to each other through suspension pivot joints (301). The leading resilient runner (311) in the resilient runner chain does not carry an adhering member. This resilient runner is connected to the chassis through a pivot joint (302) at one end and to an adjacent interior resilient runner through a pivot joint (303) at the other end. The trailing resilient runner dyad (312) in the resilient runner chain does not carry adhering members, but allows the other resilient runners to translate and rotate relative to the chassis. One end of the trailing resilient runner dyad is connected to the chassis through a pivot joint (304) and the other end is connected to an adjacent interior resilient runner through a pivot joint (305). A resilient runner roller wheel (315) is located between all adjacent interior resilient runners. The resilient runner roller wheel is connected to the interior resilient runner with its pivot axis coincident with the resilient runner pivot joint (301).

FIG. 15 shows the resilient runner chain. The resilient runner chain is formed as a series chain of links. The central links in the resilient runner chain are called the interior resilient runner links (313). The interior resilient runner links contain adhering members (330) attached and embedded within. The interior resilient runner links are connected to each other through resilient runner pivot joints (301).

These adhering members may consist of magnets when climbing ferrous structures. The leading link (311) in the resilient runner chain does not carry an adhering member. This link is connected to an adjacent interior resilient runner through a rotational joint (303). The trailing resilient runner dyad (312) in the resilient runner chain does not carry adhering members, but allows the suspension to translate and rotate relative to the chassis. The trailing resilient runner dyad is connected to an adjacent interior resilient runner link through a rotational joint (305). resilient runner roller wheels (315) are located between all adjacent interior resilient runner links. Four resilient runner roller wheels are connected to each interior resilient runner link with their rotational axes coincident with the resilient runner pivot joint (301).

FIG. 16 shows a view of a two of the interior resilient runner links (313) connected through a resilient runner pivot joint (301). At each resilient runner pivot joint, a resilient runner roller wheel (315) is attached with it rotational axis coincident with the resilient runner rotational joint. The diameter of the resilient runner roller wheel is slightly larger than the thickness of the corresponding resilient runner link such that a small amount of clearance is maintained between the climbing surface and the resilient runner link during operation.

FIG. 17 shows a single interior resilient runner link (313). The interior resilient runner link contains a series of recessed pockets (317). The adhering members are inserted into the recessed pockets in such a way as to be rigidly attached to the central resilient runner links.

FIG. 18 shows three views of the spring elements. Each spring resides in a tube (322) that serves to guide the spring and prevent buckling of the spring. The base of the spring is rigidly attached to the base of the tube (324). A terminal block (323) is rigidly attached to the distal end of the spring and slidably connected inside the tube. A cable (321) is attached at one end to the clamp and at the other end to the resilient runner pivot joint (301).

FIG. 19 shows details of the drive wheel module. The drive wheel module consists of the drive wheel motor (210), transmission (211), drive wheel frame (212), drive wheel steering shaft (213), drive wheel rolling shaft (214) and drive wheel (220). The output of the transmission (211) is rigidly connected to the drive wheel rolling shaft. The drive wheel rolling shaft pivots in a rotational joint (216) attached to the drive wheel frame. The drive wheel is rigidly attached to the drive wheel rolling shaft.

FIG. 20 shows details of the drive wheel. The drive wheel described in this embodiment consists of outer plates (221), inner plate (222), friction plate (223) and wheel adhering members (224). The inner plate contains holes that are of shape and dimension to match the wheel adhering members. The friction plate contains holes that are of shape and dimension to match the wheel adhering members. The wheel adhering members are inserted in the inner plate and the friction plate. The outer plate, inner plate and friction plat are attached through bolted connection (225) to form the drive wheel. The outer plate and inner plate are circular and have the same outer diameter. The friction plate is circular and has a diameter slightly larger than the outer plate and inner plate.

What is claimed is:

1. A climbing vehicle for traversing a climbing surface that is able to accommodate variations in geometry of the climbing surface while efficiently transferring forces while providing a large payload to weight capacity comprising,
   a chassis,
   at least one resilient runner attached to the chassis and in sliding contact with the climbing surface,
   at least one permanent magnet rigidly attached to the at least one resilient runner,
   with at least one propulsion element attached to the chassis and engaging the climbing surface.

2. The climbing vehicle of claim 1 wherein the at least one propulsion element comprises a powered wheel having a periphery which bears directly on the climbing surface.

3. The vehicle of claim 2 wherein the powered wheel is pivotally attached to an axle about a vertical axis at a center of the wheel, the axle attached to the chassis upon a pivot along a transverse axis of the vehicle.

4. The vehicle of claim 3 further having a steering actuator that controls an angular displacement of the powered wheel about the vertical axis.

5. The climbing vehicle of claim 1 wherein the propulsion element comprises an endless belt in direct engagement with the climbing surface and which belt travels around end wheels pivotally attached to the chassis.

6. The climbing vehicle of claim 1 wherein at least one resilient runner is connected to the chassis through a spring.

7. The vehicle of claim 1 wherein a roller is pivotally connected to the resilient runner having a periphery which is in direct contact with the climbing surface to reduce friction in sliding.

8. The climbing vehicle of claim 1 wherein the at least one resilient runner includes a plurality of resilient runners which are pivotally attached in a suspension chain, each end of the suspension chain pivotally attached to the chassis.

9. The vehicle of claim 8 wherein one or more rollers are pivotally connected to each resilient runner and having a periphery which is in direct contact with the climbing surface to reduce friction in sliding.

10. The vehicle of claim 9 wherein the at least one resilient runners is connected to the chassis through a spring.

11. The climbing vehicle of claim 1 wherein the at least one resilient runner includes a plurality of resilient runners which are resiliently attached to the chassis and longitudinally spaced along the chassis.

12. The vehicle of claim 11 wherein one or more rollers are pivotally connected to each resilient runner and having a periphery which is in direct contact with the climbing surface to reduce friction in sliding.

13. The vehicle of claim 12 wherein the at least one resilient runners is connected to the chassis through a spring.

14. The climbing vehicle of claim 1 wherein the at least one resilient runner is connected to the chassis through an actuator.

15. A climbing vehicle for traversing a climbing surface that is able to accommodate variations in geometry of the climbing surface while efficiently transferring forces while providing a large payload to weight capacity comprising,
    a chassis,
    a bar mounted for oscillatory movement upon the chassis,
    a resilient runner pivotally attached to the bar and in sliding contact with the climbing surface,
    with at least one permanent magnet rigidly attached to the resilient runner,
    with at least one propulsion element attached to the chassis and engaging the climbing surface.

16. The vehicle of claim 15 wherein a resilient member connects the bar to the chassis.

17. The climbing vehicle of claim 15 wherein the bar is mounted upon an axis directly across a longitudinal centerline of the vehicle or along a lateral axis of the vehicle.

18. A climbing vehicle for traversing a climbing surface that is able to accommodate variations in geometry of the climbing surface while efficiently transferring forces while providing a large payload to weight capacity comprising,
  one or more chassis units
  each chassis unit consisting of a chassis,
  at least one resilient runner attached to the chassis and in sliding contact with the climbing surface,
  and at least one permanent magnet rigidly attached to the at least one resilient runner,
  one or more chassis connecting members consisting of a bar connecting two or more chassis units allowing oscillatory movement between the chassis units,
  with at least one propulsion element attached to at least one chassis unit and engaging the climbing surface.

19. The climbing vehicle of claim 18 having at least one steering element attached to the chassis.

* * * * *